(12) United States Patent
Coleman et al.

(10) Patent No.: US 7,988,114 B2
(45) Date of Patent: Aug. 2, 2011

(54) ADJUSTABLE ELECTRONIC DEVICE HOLDER

(76) Inventors: Joseph C. Coleman, Fort Lauderdale, FL (US); Lawrence R. Gordon, Pembroke Pines, FL (US)

(*) Notice: Subject to any disclaimer, the term of this patent is extended or adjusted under 35 U.S.C. 154(b) by 222 days.

(21) Appl. No.: 12/484,177

(22) Filed: Jun. 13, 2009

(65) Prior Publication Data

US 2010/0314515 A1 Dec. 16, 2010

(51) Int. Cl.
*A47F 5/00* (2006.01)
*A47F 1/10* (2006.01)

(52) U.S. Cl. ............. 248/298.1; 248/224.51; 248/224.7; 248/224.8; 248/235; 248/241; 248/244

(58) Field of Classification Search .............. 248/298.1, 248/224.51, 224.7, 224.8, 235, 241, 244
See application file for complete search history.

(56) References Cited

U.S. PATENT DOCUMENTS

| | | | | |
|---|---|---|---|---|
| 5,400,993 | A * | 3/1995 | Hamilton | 248/279.1 |
| 5,797,568 | A * | 8/1998 | Canton Gongora et al. | 248/122.1 |
| 6,318,692 | B1 | 11/2001 | Cyrell | |
| 6,460,817 | B1 | 10/2002 | Bosson | |
| 6,729,083 | B1 * | 5/2004 | Soyko | 52/220.8 |
| 7,118,080 | B2 * | 10/2006 | Chan et al. | 248/129 |
| 2006/0000961 | A1 * | 1/2006 | Wei-Chieh et al. | 248/223.41 |
| 2007/0001078 | A1 * | 1/2007 | Martin et al. | 248/298.1 |

* cited by examiner

*Primary Examiner* — Amy J Sterling
(74) *Attorney, Agent, or Firm* — Invention Protection Associates, LLC

(57) ABSTRACT

An apparatus expanding around the perimeter of a box-shaped electronic device, the apparatus having a rectangular frame which is expandable lengthwise and widthwise and brackets for three-dimensional retention of an electronic device.

3 Claims, 6 Drawing Sheets

US 7,988,114 B2

ADJUSTABLE ELECTRONIC DEVICE HOLDER

BACKGROUND OF THE INVENTION

Entertainment center consoles of varying constructs have long been used to support television sets and house the various electronic accessories, such as cable converter boxes, VCR's and satellite receivers, which often accompany them. However, with the rise in popularity of flat panel televisions, which tend to be lighter and smaller than their predecessor televisions of comparable monitor size, stands of various configurations for enabling televisions to be mounted to walls or suspended from ceilings have been developed in the prior art. In many homes and other facilities, such stands have largely replaced entertainment center consoles due to the fact that they occupy considerably less space. Consequently, wall-mounted open shelves have become popular means for supporting the electronic accessories that were previously stored in entertainment console cabinets. However, some consumers prefer electronics mounting solutions other than horizontal shelves. Among other things, open shelves present the dangerous specter of equipment cascading down from them and landing upon unsuspecting children who may have occasion to tug on the equipment cords.

Mounting apparatuses that provide adjustable perimeter support for electronic devices have been developed as well. For example, U.S. Pat. No. 6,318,692 to Cyrell discloses an adjustable framing support system comprised of elongate side frame components which are connected by corner frame components to form a typically rectangular enclosure. The side components slide relative to the corner components, and the all have a continuous internal slot through which a cable is threaded so that the entire frame circumference contracts in response to the cable being drawn. This support system is to be placed around the lateral perimeter of an electronic device and adjusted to snugly fit thereabout. Another example is disclosed in U.S. Pat. No. 6,460,817 to Bosson. Specifically, Bosson teaches a perimeter support frame constructed of four L-shaped pieces that are in sliding relation to form a rectangular enclosure that adjustably fits around the lateral perimeter of an electronic device. The frame can be mounted to a horizontal or vertical surface to suspend the equipment from the floor. It is anticipated that the Bosson support is to be used to hold computer central processing units, but it certainly could be used to retain other types of electronic devices.

Nevertheless, there remains a need for an improved, space efficient holding apparatus that can be adjusted to fit snugly around a box-shaped electronic device so that it cannot be accidentally dislodged from the holding apparatus and that configured to mount to a vertical surface, such as a wall or the side of an entertainment center. The present invention substantially fulfills this need.

SUMMARY OF THE INVENTION

The present invention generally relates to apparatuses for mounting objects, and it is specifically directed to an apparatus that can be affixed to a wall or other flat surface and which has a rectangular frame that can be expanded and contracted bi-directionally to grip and securely retain most rectangular box-shaped electronic devices.

It is an object of the present invention to provide an apparatus for securely mounting an electronic audio or video device against a wall.

It is another object of the invention that the apparatus include a rectangular frame that can be expanded and contracted along two axes so as to be able to conform to the perimeter of rectangular box-shaped electronic devices of varying lengths and widths.

DETAILED DESCRIPTION OF THE PREFERRED EMBODIMENTS

Figure 1:
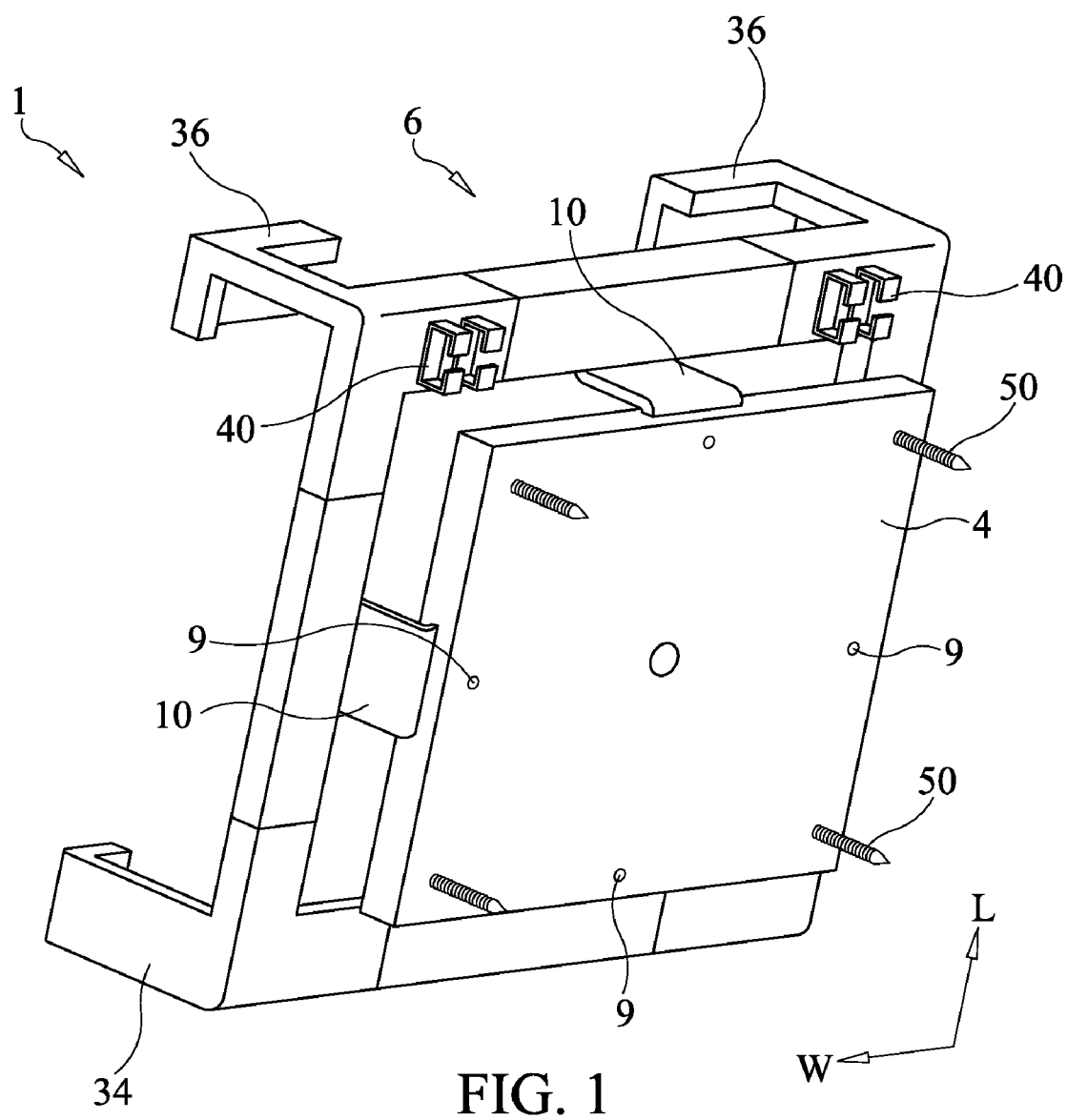
FIG. 1 is a bottom perspective view of the device holder of the present invention.
Figure 2:
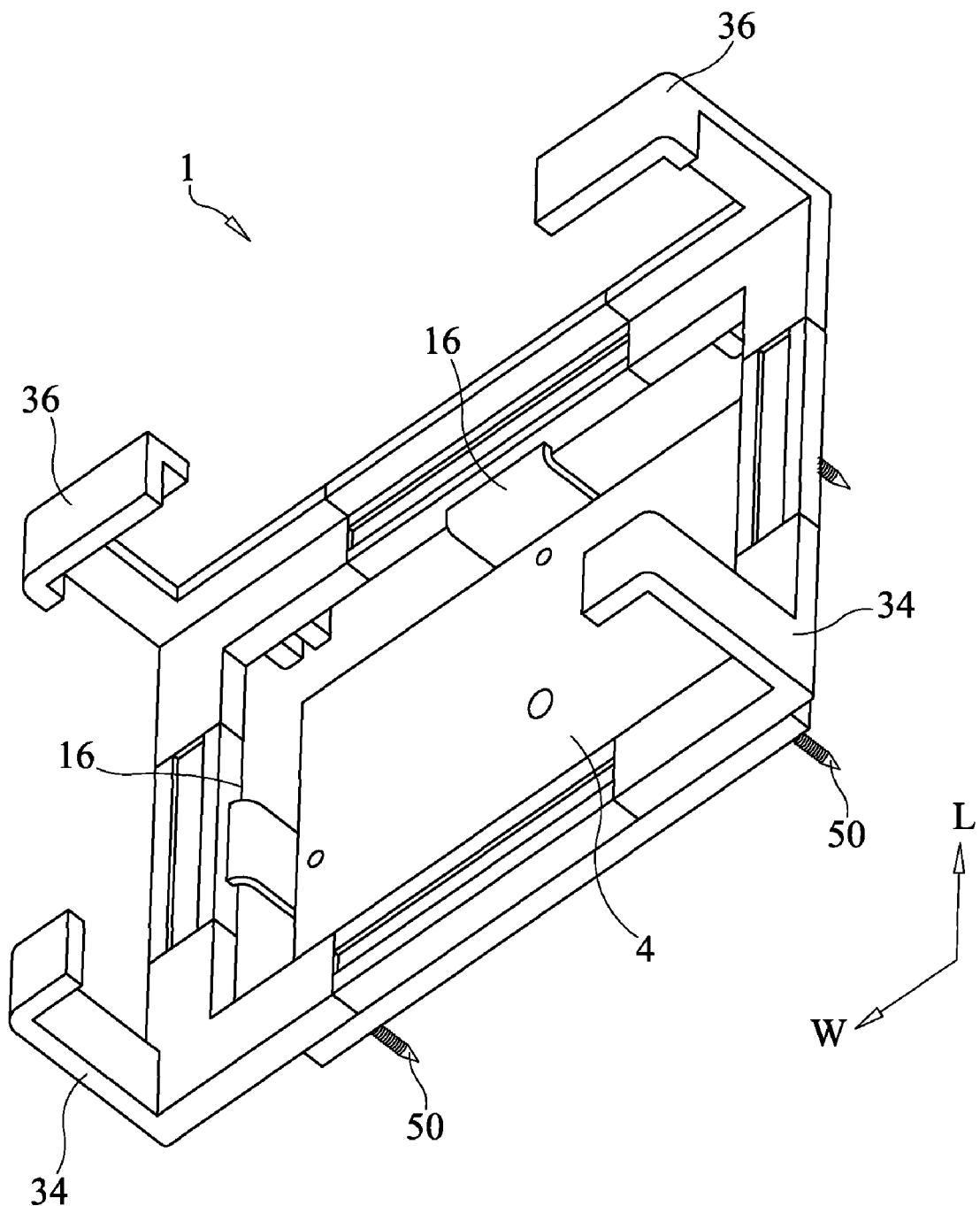
FIG. 2 is a top perspective view of the device holder.

As shown in FIGS. 1 and 2, a preferred embodiment of the expandable device holder 1 broadly comprises a base support 4 to which a rectangular perimeter frame 6 is operatively attached. As will be explained, the frame 6 is slidably expandable in the L and W directions so that it may be conformed to the lengths and widths of rectangular box-shaped devices that would be inserted into it.

Figure 6:
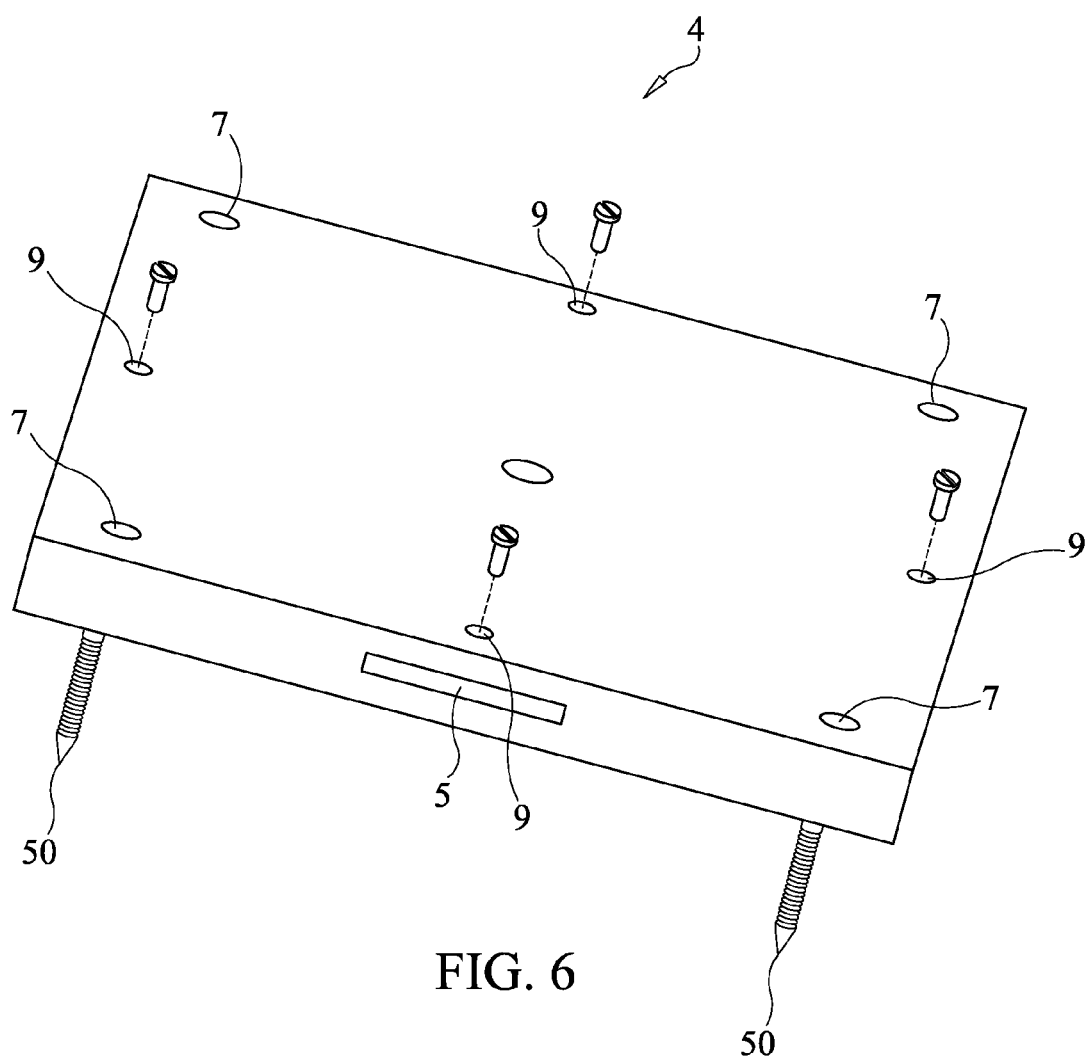
FIG. 6 is a top perspective view of the base.

As depicted in FIG. 6, the base 4 preferably has a moderately thick rectangular profile and features four non-contiguous, insertion pockets 5 (only one of which is shown) formed within its perimeter sides. Multiple threaded holes 7 extend through the base so that screws 50 may be inserted to bind the plate to a flat surface, such as a wall. The perimeter frame 6 is formed by four generally L-shaped retaining elements 30 which, themselves, are held together in an expandable rectangular configuration by four generally T-shaped connecting elements 10.

Figure 3:
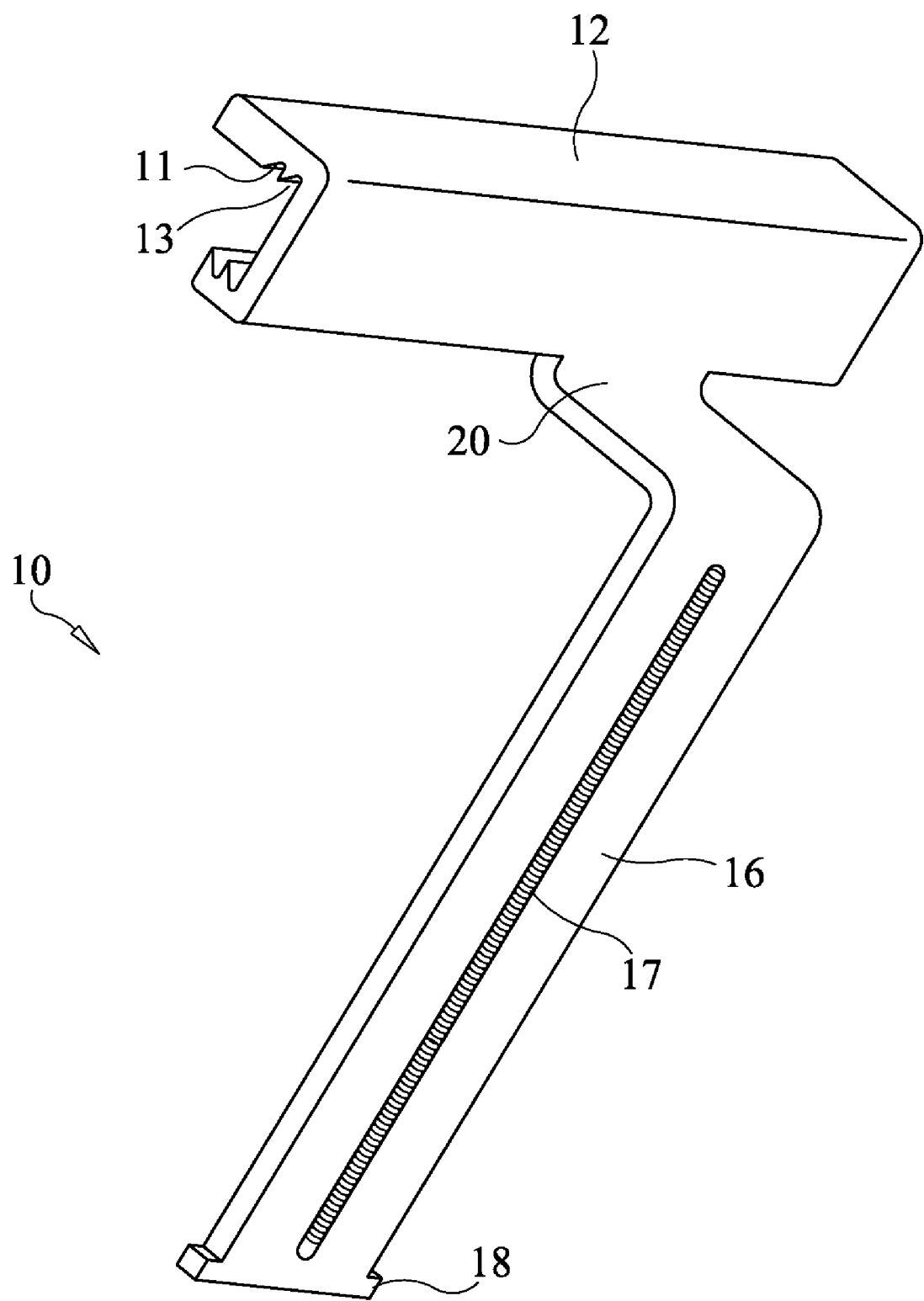
FIG. 3 is a bottom perspective view of a connector.
Figure 4:
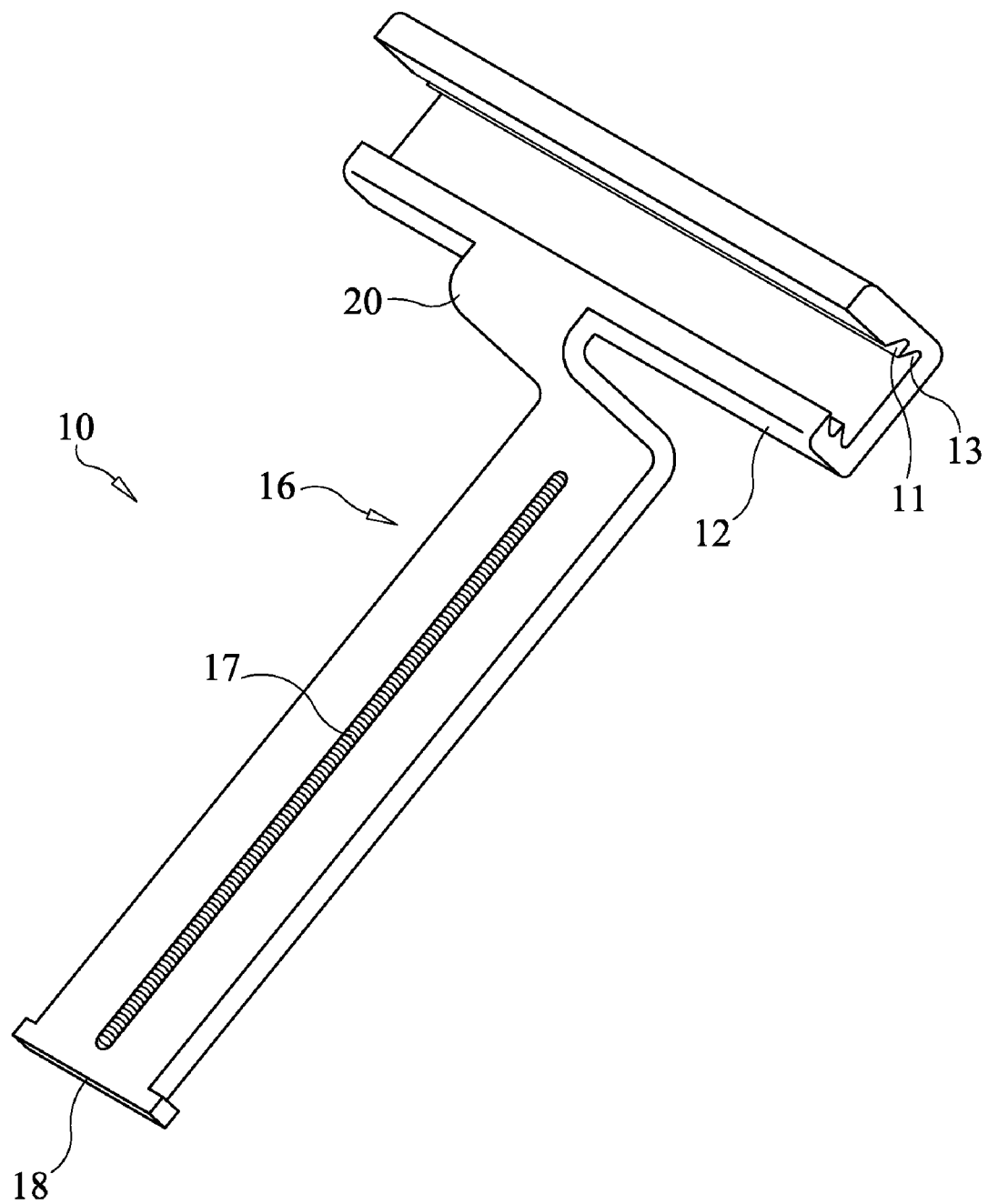
FIG. 4 is a top perspective view of a connector.
Figure 5:
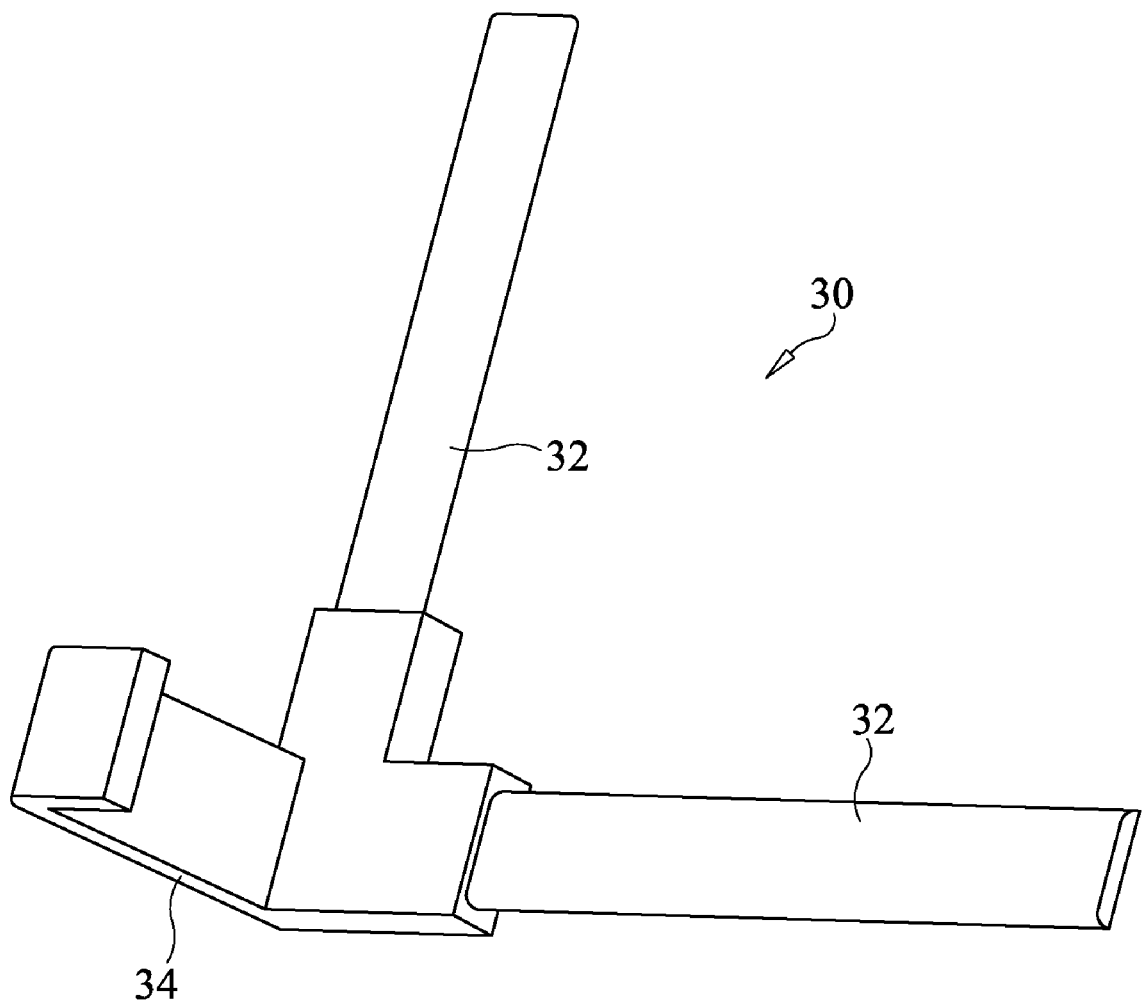
FIG. 5 is a top perspective view of a retainer.

As more clearly illustrated in FIG. 5, each retainer 30 comprises two elongate slats 32 that are perpendicularly joined by a corner bracket 34, 36. As shown in FIGS. 3 and 4, each connector 10 is formed by an elongate arm 16 and a linear slide track 12 that is perpendicularly joined at the distal end 20 of the arm 16. The connector arm slides into an insertion pocket 5 within the base plate. Running down each connector arm 16 is a notched slot 17, and within the base 4 are holes 9 axially aligned with the slots 17. Therefore, pins or screws (not shown) may be inserted through the base 4 and the connector arms 16 in order to fix the connectors 10 relative to the base 4 and thereby fix the length or width of the perimeter frame 6.

Formed within each connector's slide track 12 are parallel upper and lower slide grooves 11, 13 within which the L-shaped retainer slats 32 are slidably held. The L-shaped retainers 30 are positioned at right angles to one another to form a rectangular enclosure. Consequently, when both pairs of opposing connectors 10 are fully extended from the base 4, the diagonally facing corner brackets 34, 36 are spaced furthest apart and vice versa. In fact, the slide track portion 12 of a connector 10 can be fixedly positioned right alongside the base 4, as far away from the base 4 as the connector arm 16 will permit or anywhere therebetween. Preferably, the proximal end 18 of the connector arm 16 is flanged to prevent it from dislodging from the base 4.

At the corners of the L-shaped retainers 30 are L-shaped corner brackets 34, 36 for fitting over the corners of a box-shaped electronic device (not shown). More specifically, the brackets 34, 36 are configured so that at the front end of the frame 6, the brackets 34 face each other, and at the rear end of the frame 6, the brackets 36 both face their adjacent front end counterparts 34. This orientation ensures retention of three of the four perimeter sides of an electronic device which is set within the partial enclosure formed by the retainers 30 and their corner brackets 34, 36. The front end of the holding apparatus 1 is left unrestricted so that the device can slid in and out of the frame 6.

Preferably, the undersides of the perimeter frame 6 feature cable wire guides 40 so that a held electronic device's cable can be directed along the holder as may be appropriate.

Although the present invention has been described in some detail and with reference to and illustration of a preferred version and reference to various alternative embodiments, it should be understood that other versions are contemplated as being a part of the present invention.

What is claimed is:

1. An apparatus for mounting a rectangular box-shaped electronic device, the apparatus comprising:
    a base for securing to a wall or desk surface; and
    a rectangular perimeter frame connected to the base, the frame for holding the electronic device, wherein the frame is selectively expandable lengthwise and widthwise to contract around the device, wherein the frame has connectors each defined by a track and an arm that are attached at a distal end of the arm, wherein the arm is disposed perpendicular to the track and links the track to the base, wherein the arm slidably projects from the base, and wherein a proximal end of the arm is retained by the base; L-shaped retainers each defined by elongate perimeter members that are perpendicularly attached at a corner bracket, and wherein corner brackets are configured to provide at least two-dimensional retention of the electronic device; and wherein perimeter members of adjacent retainers slide, relative to each other, within a track positioned between the respective corner brackets of the adjacent retainers.

2. The mounting apparatus of claim 1, wherein the frame further comprises wire guide means for directing device wire.

3. The mounting apparatus of claim 1, wherein the connector arms have grooved slots formed through them, and wherein the base has holes that are axially aligned with the slots such that pins may be inserted through both the base and the connector arms to selectively fix the connectors and retainers in relative positions.

* * * * *